United States Patent [19]
Brisson

[11] Patent Number: 5,956,410
[45] Date of Patent: Sep. 21, 1999

[54] AUDIO TRANSMISSION LINE WITH ENERGY STORAGE NETWORK

[76] Inventor: Bruce A. Brisson, 3037 Grass Valley Hwy., Auburn, Calif. 95602

[21] Appl. No.: 08/551,292

[22] Filed: Oct. 31, 1995

[51] Int. Cl.$^6$ ............................................. H04B 15/00
[52] U.S. Cl. ..................... 381/94.1; 381/77; 330/149
[58] Field of Search .................. 381/94, 77, 94.1, 381/94.6; 330/149, 53

[56] References Cited

U.S. PATENT DOCUMENTS

| | | |
|---|---|---|
| 3,870,958 | 3/1975 | Rypinski et al. . |
| 4,177,431 | 12/1979 | Polk, Jr. . |
| 4,236,118 | 11/1980 | Turner . |
| 4,280,018 | 7/1981 | Lazarus et al. . |
| 4,594,559 | 6/1986 | Bernzweig . |
| 4,597,100 | 6/1986 | Grodinsky et al. . |
| 4,750,203 | 6/1988 | Defretin . |
| 4,954,787 | 9/1990 | Brisson ..................................... 381/94 |
| 5,061,821 | 10/1991 | Nercessian . |
| 5,181,000 | 1/1993 | Smith . |
| 5,266,744 | 11/1993 | Fitzmaurice . |

FOREIGN PATENT DOCUMENTS

| | | |
|---|---|---|
| 43 04 013 A1 | 8/1994 | Germany . |
| WO 8500479 | 1/1985 | Switzerland . |

*Primary Examiner*—Ping W Lee
*Attorney, Agent, or Firm*—Jill L. Robinson

[57] ABSTRACT

An audio signal transmission line including capacitive and/or inductive networks connected in series or parallel with an audio transmission cable providing for increased storage of electrical energy, and thereby overcoming energy storage problems associated with previous audio signal transmission systems which create unwanted pre-emphasis of audio signals at certain frequencies.

19 Claims, 8 Drawing Sheets

AUDIO TRANSMISSION LINE WITH ENERGY STORAGE NETWORK

BACKGROUND OF THE INVENTION

1. Field of the Invention

The present invention relates to audio signal transmission in general and in particular to the use of a capacitive network placed between the positive and negative conductors of audio signal transmission line and/or an inductive network placed in series or parallel with the positive and/or negative conductor of an audio signal transmission line, to significantly reduce or eliminate audible pre-emphasis created by non-uniform storage of energy within the line.

2. Description of the Relevant Art

An audio signal transmission system usually comprises an audio signal generator and a load coupled to the generator by means of an audio signal transmission line. For example, the generator may comprise an acoustic transducer, such as a microphone, preamplifier or an amplifier; the load may comprise an amplifier or a speaker; and the audio signal transmission line comprises a pair of conductors such as twisted or untwisted, single or multistrand wires or a coaxial cable. One member of the pair, the send line, connects the positive terminal of the generator to the positive terminal of the load and the other, the return line, connects the negative terminal of the generator to the negative terminal of the load.

The audio frequency spectrum is generally considered to encompass a frequency range from 20 Hz to 20 kHz. In transmitting music and other signals having a broad range of frequencies under certain conditions an audible pre-emphasis can be detected in audio signal transmission systems coupled with audio signal transmission cable. For example, in one particular type of audio cable, there is an emphasis of the higher audio frequency components of musical information. Thus, a musical signal containing information of frequencies greater than 100 Hz audibly had more weight and substance than the information at or below 100 Hz through the speakers in the audio signal transmission system. To the human ear, this sounds unnatural, and is therefore undesirable.

Noise at certain frequencies can create the appearance of unwanted emphasis or pre-emphasis of certain sounds at unwanted times, as noise may cause certain desired sounds, particularly at lower frequencies, to become less "focused". The solution to this type of pre-emphasis is to reduce or eliminate noise. In U.S. Pat. No. 4,954,787, a circuit is provided that comprises a discrete capacitor coupled in series with a discrete resistor so as to reduce noise in audio transmission systems.

The apparatus and method described in U.S. Pat. No. 4,954,787 constrains the chosen values of the discrete capacitance and the discrete resistance such that the total capacitance of the audio transmission system, i.e. the sum of the distributed capacitance of the audio transmission line and the discrete capacitance, and the discrete resistance constitute an RC time constant that is above the audio frequency range but within the passband of the audio signal source. This approach necessarily constrains the patented noise suppression network to comprise small values of capacitance and large values of resistance, since it is taught that it is desirable to have a discrete resistor that is equal to or greater than the output impedance of the amplifier so as not to unduly load the amplifier down at high frequencies, and that the value of the discrete capacitance be as low as possible to save space.

In U.S. Pat. No. 5,142,252, a transmission line is provided that comprises a compensating inductance added to the line to overcome the parasitic and dielectric capacitance of the line and reduce noise generated in the line by low frequency, low level audio signals. The necessary magnitude of the inductance depends upon the parasitic and distributed capacitance of the transmission line, and the patent describes creating a low impedance path to low audio frequencies, which inherently suggests the desirability of a low level of energy storage by the inductor.

Noise as such, however, is not the only source of transmission line created pre-emphasis. Therefore, the circuits disclosed by U.S. Pat. Nos. 4,954,787 and 5,142,252 do not eliminate all sources of pre-emphasis in a transmission line. In particular, they do not eliminate the pre-emphasis caused by having significantly differing amounts of energy storage in an audio cable as a function of frequency, which can affect sound quality over the entire range of audio frequency spectrum.

SUMMARY OF THE INVENTION

In view of the foregoing, the principal object of the present invention is a novel cable for reducing or eliminating certain audible pre-emphasis caused by audio signal transmission lines in an audio signal transmission system.

As discussed above, the typical audio transmission system comprises, inter alia, an amplifier for amplifying audio signals and a load coupled to the amplifier by means of an audio signal transmission cable.

From an investigation of the physical mechanisms which give rise to the pre-emphasis, it appears that at certain frequencies, the parallel capacitance of the cable is predisposed to store a greater magnitude of electrical energy than at other frequencies. Furthermore, the series distributed inductance of the cable is also predisposed to store a greater magnitude of electrical energy at certain frequencies than at others. For example, in some audio signal transmission lines it was found that more energy was stored at the higher audio frequencies than at the lower audio frequencies.

Through these investigations, the inventor came to realize that the tonal quality of the audio signal of the system was related to the magnitude and consistency of the energy stored in the audio transmission cable. While it is well known that in an audio system the load draws energy primarily from the source, the load also draws from the energy reservoir that is stored in the cable. The difference in energy storage at different frequencies thus can lead to an audible pre-emphasis in the frequency ranges that have a larger magnitude of energy stored within the line. Thus, the inventor realized that it was desirable to have a consistent and high storage of energy within the transmission line.

In one experimental trial, the cable consisted of a pair of parallel wires with the send and return conductors of the cable forming plates of a capacitor and the dielectric insulation used for separating the send and return conductors of the cable forming the dielectric. The dielectric material not only controls the capacitance of the cable via material and thickness, but also forms the medium for the storage reservoir of charge and therefore affects the degree of power losses as further described below.

Investigation of the cable using an impedance meter yielded that a 3 meter pair of unterminated parallel wires had a total distributed capacitance of 90 pF. Furthermore, using the impedance meter it was shown that at a frequency of 80 Hz the impedance phase angle was found to be −85.46°, and at a frequency of 431 Hz the phase angle was found to be −87.37°.

A capacitor having a capacitance C in Farads and an applied voltage V in Volts will store an electrostatic energy J in Joules given by the formula:

$$J=\tfrac{1}{2}CV^2$$

Using a typical applied amplifier voltage of 50V, the cable would thus be capable of storing $$J=\tfrac{1}{2}(90\times10^{-12})\,(50^2)$$

$$J=112.5\text{ nJ}$$

of energy between the positive and negative conductors of the cable.

However, not all energy is transferred in a nonideal system. There will be electrical losses. As is well-known, the power factor is used to determine electrical losses in a capacitor having a phase angle $\theta$ and is given by the following formula:

$$PF\,\%=\cos{(\theta)}\times100\%$$

Taking into account the losses associated with the phase angles yields:
at 80 Hz $$\cos{(-85.46°)}\times100\%=7.92\%$$

$$112.5\text{ nJ}-7.92\%=103.6\text{ nJ}$$

and at 431 Hz $$\cos{(-87.37°)}\times100\%=4.41\%$$

$$112.5\text{ nJ}-4.41\%=107.6\text{ nJ}$$

This represents a 3.86% change in energy storage from 80 Hz to 431 Hz. In high-quality expensive audio systems where component tolerances are held to 1%, this results in a clearly audible and undesirable effect on the quality of the signal transmitted.

A similar investigation of a cable using an impedance meter found that the 3 meter positive conductor had a total distributed inductance of 5 $\mu$H. The cable consisted of a pair of parallel wires with the windings of the send and return conductors of the cable forming coils of a inductor. At a frequency of 100 Hz the impedance phase angle was found to be 3.98°, and at a frequency of 1 kHz the phase angle was found to be 32.35°.

An inductor having a inductance L in Henries and an applied current I in Amperes will store an energy J in Joules within the magnetic field given by the formula:

$$J=\tfrac{1}{2}LI^2$$

Using a typical applied amplifier current of 2 A, the cable would thus be capable of storing $$J=\tfrac{1}{2}(5\times10^{-6})\,(2^2)$$

$$J=10\,\mu J$$

of energy within the windings of the conductors of the send line of the cable.

As in the case with capacitance, the power factor is used to determine electrical losses of inductors. In a inductor having a phase angle $\theta$, the power factor is given by the following formula:

$$PF\%=\cos{(\theta)}\times100\%$$

Thus in the sample cable, the losses associated with the phase angles would be:
at 100 Hz $$\cos{(3.98°)}\times100\%=99.98\%$$

$$10\,\mu J-99.98\%=0.2\,\mu J$$

and at 1 kHz $$\cos{(32.35°)}\times100\%=82.7\%$$

$$10\,\mu J-82.7\%=1.73\,\mu J$$

This represents a 765% change in energy storage from 100 Hz to 1 kHz, and is clearly undesirable in high-quality audio systems where component tolerances are held to 1%.

In addition to the noise suppression mechanisms described above, improvement in the performance of audio transmission lines, has, in the past, been achieved by various methods of precise manufacture of the cables or conductors and the use of expensive materials. However, these methods are labor intensive and expensive. Furthermore, even in expensive and high-quality audio signal transmission lines, which have capacitances and inductances which do not vary as greatly as the experimental cable described above, there still will an energy storage between the positive and negative conductors of the line in the form of an electric field and this energy is usually not stored uniformly within the audio frequency range. Thus, the pre-emphasis caused by non-uniform energy storage may still exist even in high-quality lines.

The inventor discovered that the benefits of additional energy storage capacity is sometimes of more significance in a transmission line than a potential reduction in bandwidth below 20 kHz. Thus, for example, although on would not normally choose to use large-value capacitive networks on audio transmission lines, in part because of the fear of roll-off, the inventor's realization made the use of such networks reasonable for the purpose of increasing energy storage, and thus the performance of an audio transmission line.

In accordance with the invention, to eliminate audible pre-emphasis, components are added to the transmission line to store electrical energy in a more uniform manner throughout the entire 20 Hz–20 kHz audio frequency range. Use of precision components which themselves store energy in a predictable manner are, of course, preferable. Such components comprise a capacitive network coupled between the send and return lines of the transmission line and/or an inductive network, either in series or parallel with the send line, or both. The particular networks used in a particular line are selected based upon the intended use of the audio transmission line, and particularly upon the nature of the conductors used and the anticipated voltage and current characteristics used in the transmission of the audio signal.

The capacitive network is connected between the conductors so that the conductors are essentially connected in parallel. The capacitive network may be placed anywhere along the transmission line although suitably not so that it would connect the positive and negative terminals of the source when in use, and in practice has successfully been placed at a distance approximately one foot from the end of the pair of conductors that is, in use, connected to the positive and negative terminals of the source. This allows the use of noise-reducing inventions such as shown in U.S. Pat. No. 4,954,787 and U.S. Pat. No. 5,142,252 in their preferred locations. It is also suitable to use more than one capacitive network, and distribute these networks along the transmission line.

The inductive network can be coupled in series or in parallel with the send line, and is suitably placed near the generator or source end of the line, which allows the preferred placement of noise-reducing inventions as noted above. However, the inductive network may be placed at other locations, and multiple inductive networks may be distributed along the transmission line. Furthermore, the inductive network may be placed in the return line in either a series or parallel configuration.

Using the invention described herein, percentage changes of energy storage in the cable or conductor as a function of frequency can be made approximately uniform, that is, more uniform than the changes in energy storage associated with the cable or conductor without the networks, thereby reducing or eliminating undesirable audio frequency pre-emphasis. Indeed, using the invention described, change of energy storage in the cable or conductor of less than 1% can be achieved. Furthermore, because the cost of the networks described is significantly less than manufacture of precision audio transmission lines, use of the invention allows the creation of an audio transmission line with quality equal to or greater than previous very expensive designs, but at a lower cost for the same or better level of sound quality.

BRIEF DESCRIPTION OF THE DRAWINGS

The above and other objects, features and advantages of the present invention will become apparent from the following detailed description of the accompanying drawings, in which.

DETAILED DESCRIPTION OF THE DRAWINGS

The present invention is directed to an audio signal transmission line with an energy storage network for eliminating undesired pre-emphasis of certain frequency ranges in an audio signal transmission system.

Figure 1:
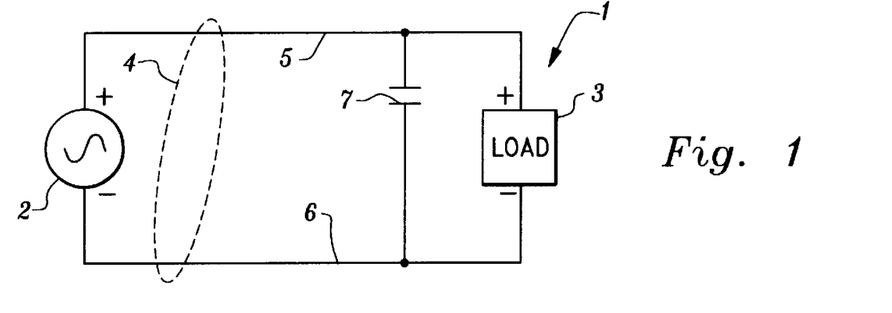
FIG. 1 is a schematic of an audio transmission system including an embodiment of a capacitive network according to the present invention.

Referring to FIG. 1 there is provided in accordance with the present invention an audio signal transmission system designated generally as 1. In the system 1 there is provided a source for audio signals 2 and a load 3 which is coupled to the source 2 by means of a transmission line designated generally as 4. The source 2 may be, for example, a microphone or other acoustic transducer, a preamplifier, amplifier, or a similar device, as is well-known in the art. The load 3 may be a preamplifier, amplifier, speaker, or similar device as is also well-known in the art. The transmission line 4 may comprise a pair of twisted or untwisted, single or multistrand wires or a coaxial cable, or any other commonly-used conductor or other material suitable for a transmission line. As is conventional, the source 2 and the load 3 each comprise a positive terminal and negative terminal denoted by positive and negative signs, respectively. The transmission line 4 comprise a conductor, or send line, 5 coupled between the source 2 and load 3 and another conductor, or return line, 6 coupled between the negative terminals of source 2 and load 3.

In accordance with the present invention there is provided in the system 1 a capacitive network of a capacitor 7, which network is coupled in parallel to the load and source within the transmission line 4 between the send line 5 to return line 6. Capacitive network 7 may be placed in parallel anywhere between send line 5 and return line 6, though suitably not directly at the coupling point of send line 5 and return line 6 to source 2.

By way of example, in a working embodiment of the invention shown in FIG. 1, capacitor 7 was placed near the coupling of send line 5 and return line 6 to load 3 and comprised a value of 100 picofarads. In another working embodiment of FIG. 1, capacitor 7 was placed near source 2 a distance of 1 foot away from the coupling point of send line 5 and return line 6 to source 2, where said coupling point comprises the origin for distance measurements along transmission line 4.

Figure 2:
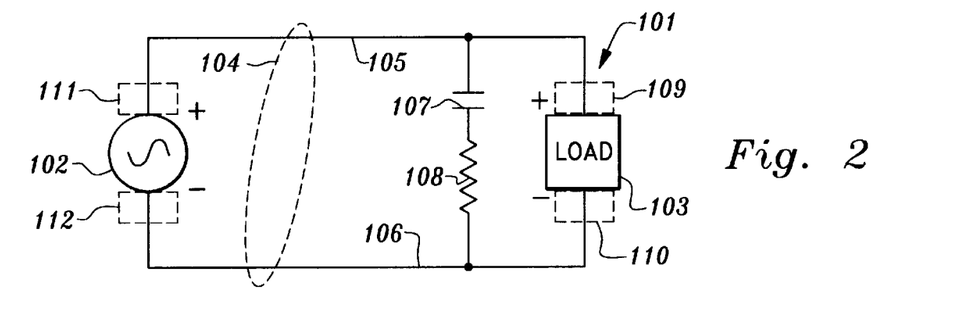
FIG. 2 is a schematic of an audio transmission system including a second embodiment of a capacitive network according to the present invention.
Figure 20:
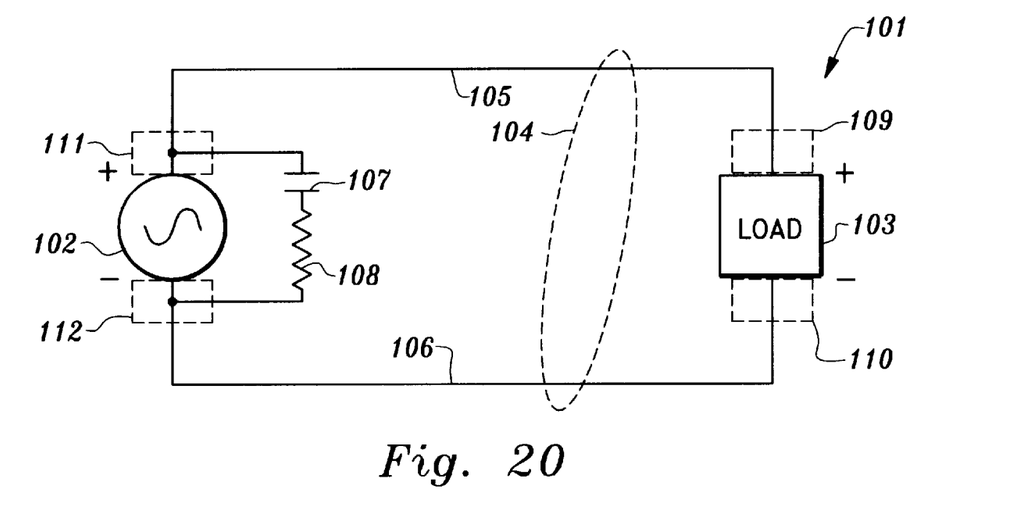
FIG. 20 is a schematic of an audio transmission system similar to FIG. 2, showing an alternative placement of the capacitive network.
Figure 21:
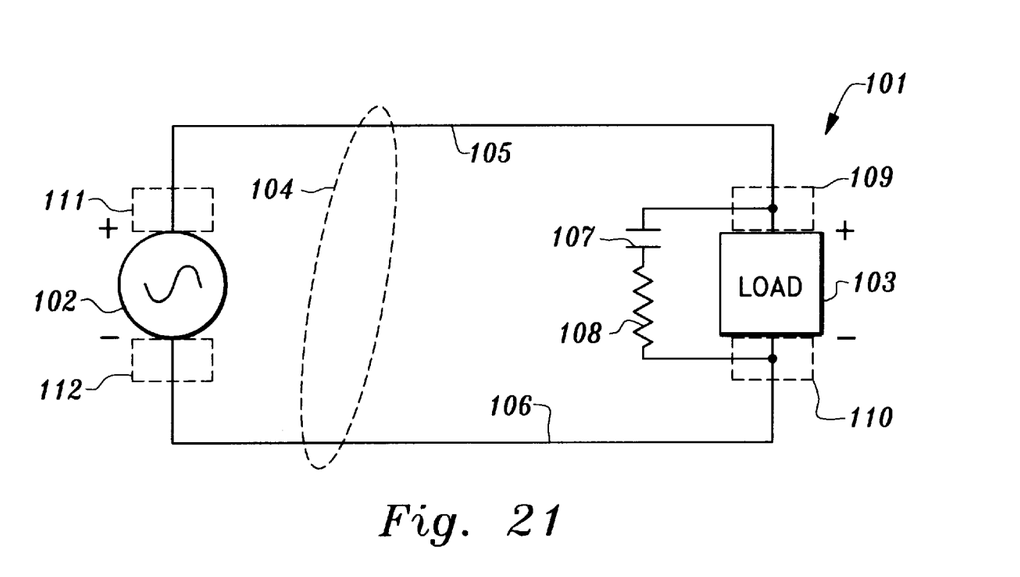
FIG. 21 is a schematic of an audio transmission system similar to FIG. 2, showing another alternative placement of the capacitive network.

Referring to FIGS. 2, 20 and 21 there is provided a capacitive network of a resistor 108 coupled in series with capacitor 107, which is coupled in parallel with transmission line 104 from send line 105 to return line 106. The resistor 108 and capacitor 107 may be placed anywhere in the system, including at the input terminals 111, 112 or output terminals 109, 110 (shown in FIGS. 20 and 21, respectively), though preferably not directly at the coupling point of send line 105 and return line 106 to source 102.

By way of example, in a working embodiment of FIG. 2, the capacitive network of resistor 108 and capacitor 107 was placed near the output terminals 109, 110 of send and return lines 105, 106 which connect such sent and return lines to load 103. Resistor 108 has a value of 3 ohms and capacitor 107 has value of 100 picofarads. In another working embodiment of FIG. 2, the network of resistor 108 and capacitor 107 was placed near source 102 a distance of 1 foot away from input terminals 111, 112 of send and return lines 105, 106 which connect such send and return lines to source 102.

Figure 3:
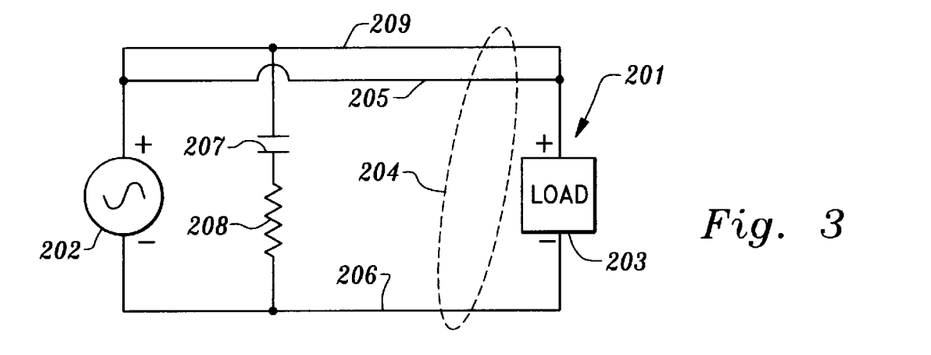
FIG. 3 is a schematic of an audio transmission system including a third embodiment a capacitive network according to the present invention.

Referring to FIG. 3 there is a capacitive network of a resistor 208 coupled in series with capacitor 207 which is coupled in parallel with additional conductor 209 which is coupled between the positive terminal of source 202 and the positive terminal of load 203 in parallel with the additional conductor 209. The send line 205 also couples the positive terminals of the source 202 and the load 203. The capacitive network may be placed anywhere in system 201, although preferably not directly at the coupling point of send line 205 and return line 206 to source 202.

By way of example, in a working embodiment of the invention as shown in FIG. 3, the capacitive network of resistor 208 and capacitor 207 was placed between additional conductor 209 and return line 206, near the coupling of send line 205 and return line 206 to load 203 and resistor 208 comprised a value of 3 Ohms and capacitor 207 comprised a value of 0.1 microfarads. In another working embodiment of the invention as shown in FIG. 3, the capacitive network of resistor 208 and capacitor 207 was placed at a distance of 1 foot away from the coupling point of send line 205 line 206 line 206 to source 202.

Figure 4:
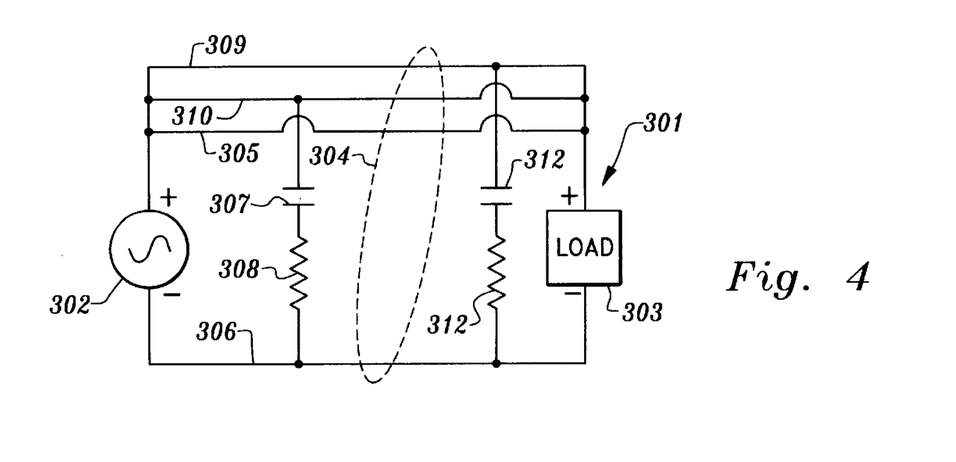
FIG. 4 is a schematic of an audio transmission system including a fourth embodiment of a capacitive network according to the present invention.

Referring to FIG. 4 there are three conductors 305, 309 and 310 connected between the positive terminals of the source 302 and the load 303, including the send line 305 and a first and second additional conductor 309 and 310. The capacitive network of resistor 308 coupled in series with capacitor 307 is coupled in parallel between conductor 310 and return line 306. An additional capacitive network of resistor 311 coupled in series with a capacitor 312 is coupled in parallel between conductor 309 and return line 306. The capacitive networks may be placed anywhere in system 1, though preferably not directly at the coupling point of send line 305 and return line 306 to source 2.

By way of example, in a working embodiment of FIG. 3, each of the capacitors 307, 312 in the two capacitive networks had a value of 0.1 microfarads, and the two resistors 308, 311 in each network had a value of 3 ohms. One network was placed near the coupling of send line 305 and return line 306 to load 303, while the other was placed near source 302 a distance of 1 foot away from the coupling point of send line 305 and return line 306 to source 302.

Figure 5:
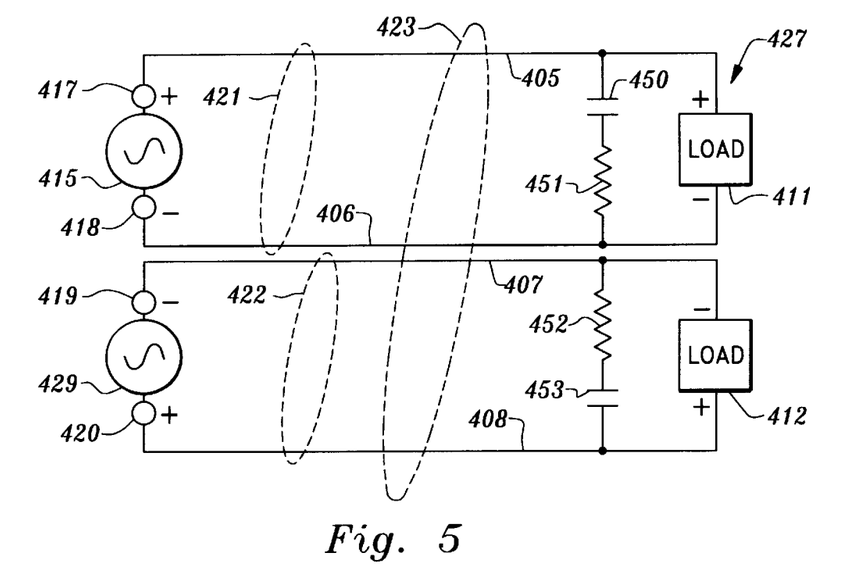
FIG. 5 is a schematic of a bi-amped audio transmission network including a fifth embodiment of a capacitive network according to the present invention.

Referring to FIG. 5, there is provided a bi-amped and bi-wired audio transmission system 427. Audio signal source 415, comprises a positive output terminal 417 and a negative output terminal 418. Audio signal source 429, comprises a positive output terminal 420 and a negative output terminal 419. Audio signal load 411 and audio signal load 412 each include positive and negative input terminals denoted by positive and negative signs, respectively. The system includes audio signal transmission line 423, which comprises conductor bundle 421 with positive conductor or send line 405 coupled between positive terminal 417 and the positive terminal of load 411, and negative conductor or return line 406 coupled between negative terminal 418 and the negative terminal of load 411; and conductor bundle 422 with positive conductor or send line 408 coupled between positive terminal 420 and the positive terminal of load 412 and negative conductor or return line 407 coupled between negative terminal 419 and the negative terminal of load 412. A capacitive network comprising capacitor 450 and resistor 451 coupled in series, is coupled between send line 405 and return line 406. A second capacitive network of capacitor 453 and resistor 452 is coupled between send line 408 and return line 407.

In a working embodiment of the invention as depicted in FIG. 5, each of the capacitors 450, 453 had a value of 0.1 mF and each of the resistors had a value of 4 ohms. Load 411 was optimized for high audio frequencies, such as a tweeter, and load 412 was optimized for low audio frequencies, such as a woofer.

Figure 6:
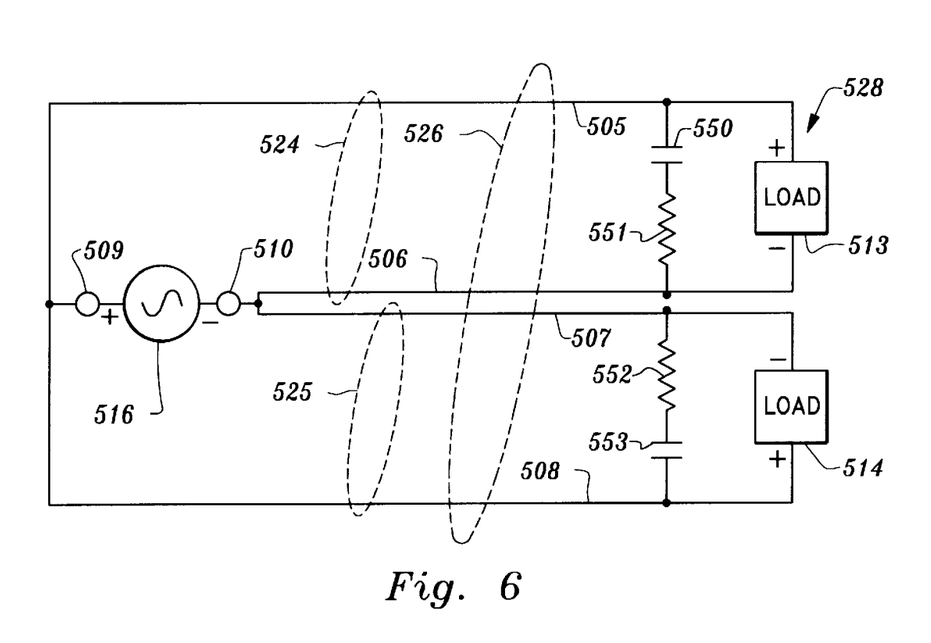
FIG. 6 is a schematic of a bi-wired audio transmission network including a sixth embodiment of a capacitive network according to the present invention.

FIG. 6 shows a bi-wired audio transmission system 528. Audio signal source 516, has positive output terminal 509 and negative output terminal 510. Audio signal load 513 and audio signal load 514, have corresponding positive and negative input terminals denoted by positive and negative signs, respectively. Audio transmission line 526, includes conductor bundles 524, 525. Conductor bundle 524 comprises conductor or send line 505 coupled between positive terminal 509 and the positive terminal of load 513, and conductor or return line 506 coupled between negative terminal 510 and the negative terminal of load 513. Conductor bundle 525 comprising positive conductor or send line 508 coupled between positive terminal 509 and the positive terminal of load 514, and negative conductor or return line 507 coupled between negative terminal 510 and the negative terminal of load 514. In a working embodiment of FIG. 6, capacitors 550, 553 each had a value of 0.1 mF and resistors 551, 552 each had a value of 4 ohms. Load 513 was optimized for high audio frequencies, such as a tweeter, and load 514 was optimized for low audio frequencies, such as a woofer.

Figure 7:
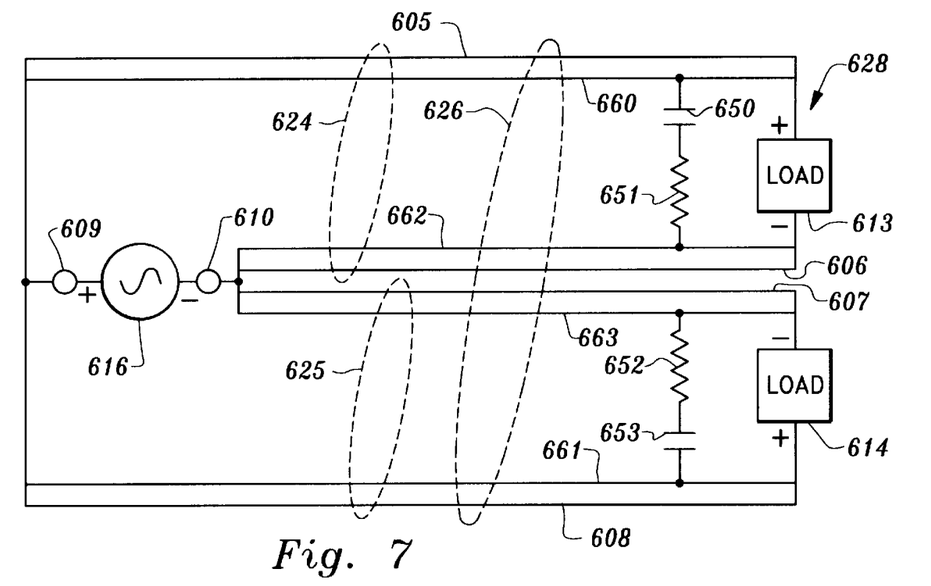
FIG. 7 is a schematic of a bi-wired audio transmission network including a seventh embodiment of a capacitive network according to the present invention.

FIG. 7 is a bi-wired audio transmission system, having source 616, with positive terminal 609 and negative terminal 610 and two loads 613, 614, preferably optimized for different frequency ranges. The source 616 and loads 613, 614 are connected by send lines 605, 608 and by additional conductors 660, 661 between the positive terminal 609 of the source 616 and the positive terminal of the loads 613, 614. The negative terminal 610 of source 616 is connected by return lines 606, 607 and additional conductors 662, 663. The capacitive network of capacitor 650 and resistor 651 is coupled in parallel between the additional conductors 660, 662. A second capacitive network of capacitor 653 and resistor 652 is connected in parallel between additional conductors 663, 661.

Figure 8:
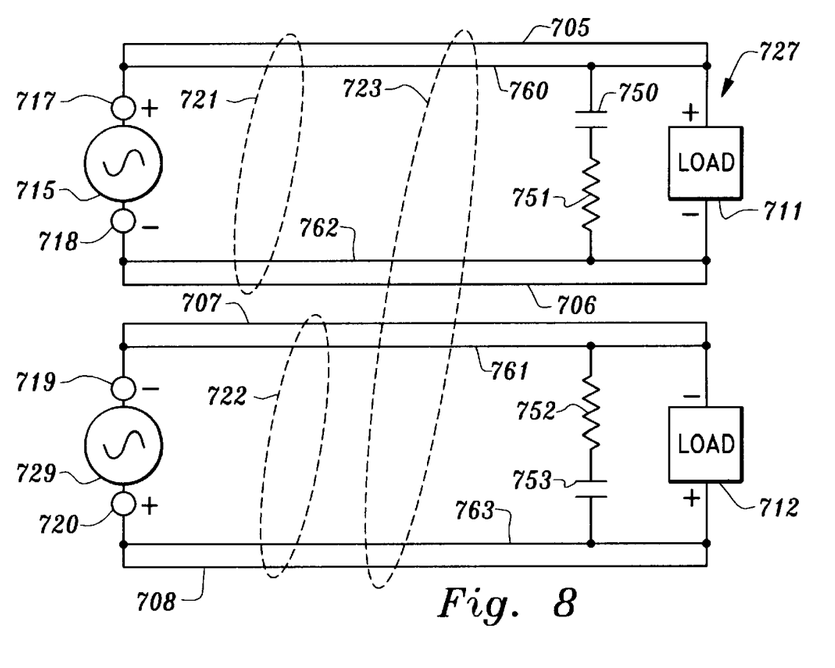
FIG. 8 is a schematic of a bi-amped audio transmission network including an eighth embodiment of a capacitive network according to the present invention.

FIG. 8 is a bi-amped audio transmission system, with sources 715, 729 and loads 711, 712 connected by transmission line 723 such that the positive terminal 717 of source 715 is connected to the positive terminal of load 711 by the send line 705 and an additional conductor 760. The positive terminal 720 of source 729 is connected to the positive terminal of the load 712 by send line 708 and additional conductor 763. The negative terminals 718, 720 of the sources 715, 729 and loads 711, 712 are also respectively connected by additional conductors 763, 761 as well as the return lines 706, 708. Capacitive networks of capacitors 750, 753 and resistors 751, 752 are coupled in parallel between the additional conductors 760, 761, 762, 763.

Figure 9:
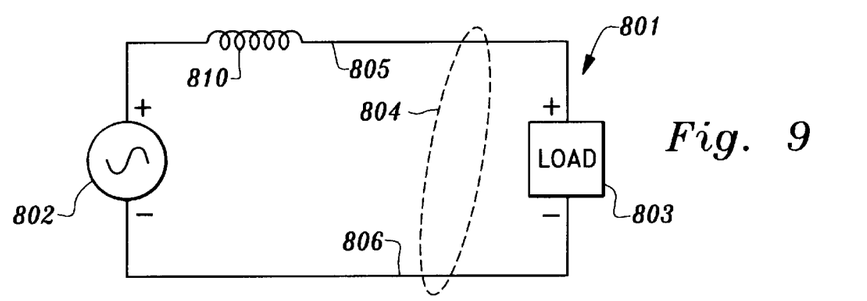
FIG. 9 is a schematic of an audio transmission system including an embodiment of an inductive network according to the present invention.

Referring now to FIG. 9 there is provided in accordance with the present invention an audio signal transmission system designated generally as 801. In the system 801 there is provided a source for audio signals 802 and a load 803 which is coupled to the source 802 by a transmission line 804 comprising a pair of conductors: a send line 805 coupled between the positive terminals of source 802 and load 803 and a negative conductor or return line 806 coupled between the negative terminals of source 802 and load 803. There is further provided an inductive network 810 coupled in series with line 805 between source 802 and load 803, suitably near the source end of the line 805. In a working embodiment of FIG. 9, inductive network 810 comprised an inductor with a value of 50 microhenries.

Figure 10:
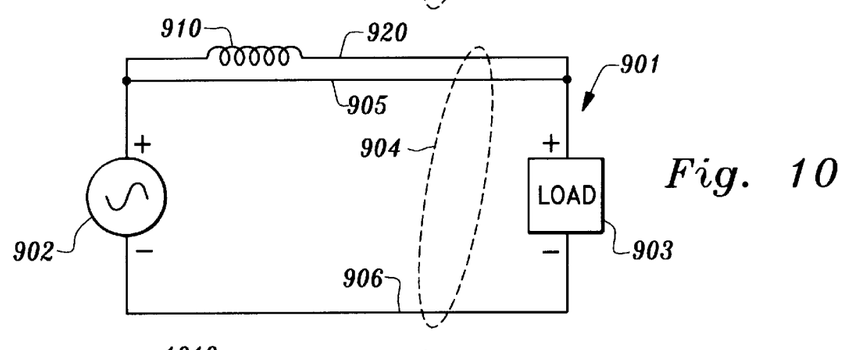
FIG. 10 is a schematic of an audio transmission system including a second embodiment of an inductive network according to the present invention.

Referring to FIG. 10 there is provided an inductive network 910 comprising an inductor, coupled in parallel with transmission line 904 along the send line 905 and in series with an additional conductor 920. The negative terminals of the source 902 and load 903 are coupled by return line 906. The inductive network is located near the source end of line 905. In a working embodiment of the invention as shown in FIG. 10, inductive network 910 comprised an inductor with a value of 1 millihenry.

Figure 11:
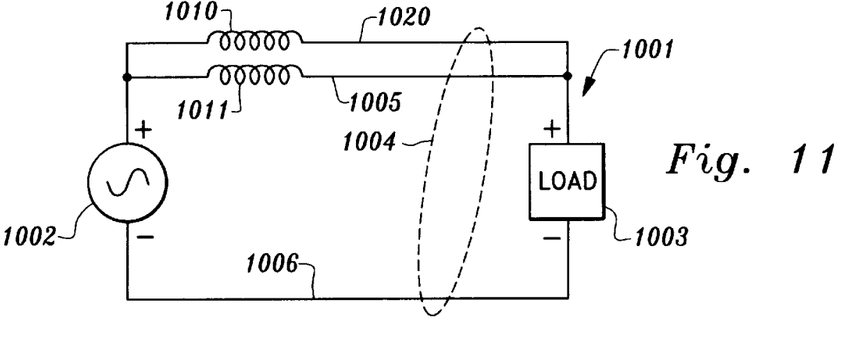
FIG. 11 is a schematic of an audio transmission system including a third embodiment of inductive networks according to the present invention.

Referring to FIG. 11 there are provided inductive networks 1011 and 1010 consisting of inductors in series with send line 1005 and additional conductor 1020, respectively. The send line 1005 and additional conductor 1020 connect the positive terminals of the source 1002 and load 1003. Return line 1006 connects the negative terminals of source and load. Together the conductors 1020, 1005 and 1006, and inductors form the transmission line 1004. In a working embodiment of the invention as shown in FIG. 11, inductive network 1010 was an inductor having a value of 2 millihenries, and inductive network 1011 was also an inductor having a value of 2 millihenries.

Figure 12:
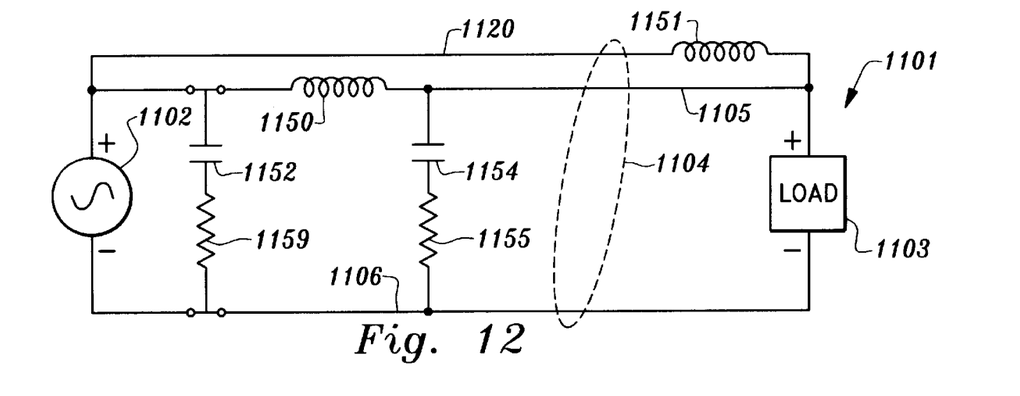
FIG. 12 is a schematic of an audio transmission system including a capacitive network and an inductive network according to the present invention.

Referring to FIG. 12 there is provided inductive network 1150 of an inductor, which network is coupled in series with send line 1105 and is located near the source end of transmission line 1104. Source 1102 and load 1103 are connected by transmission line 1104. In accordance with the teaching of U.S. Pat. No. 4,954,787, an interface circuit formed by capacitor 1152 and resistor 1159 is connected at the output terminals of the source 1102 between the send line 1105 and return line 1106. A capacitive network of capacitor 1154 in series with resistor 1155, wherein the components are selected in accordance with the teachings associated with FIGS. 1 to 8, is also connected between the send line 1105 and return line 1106. An inductor 1151, selected in accordance with the teaching of U.S. Pat. No. 5,142,252 in connected in parallel with the send line 1105, along conductor 1120 which connects the positive terminals of the source 1102 and load 1103.

Capacitor 1152 and resistor 1159 function to define the upper frequency roll-off of the audio system, placing said roll-off above the audio frequency range and within the passband of source 1103 so as to prevent the generation of audio noise in said audio system. Inductor 1151 is placed in parallel with send line 1105 near the load end of transmission line 1104 to overcome parasitic and dielectric capacitance of the line so as to reduce audio frequency noise in the line generated in the line by low level and low frequency audio signals.

According to the teachings of the present invention, capacitor 1154 and resistor 1155 form a parallel capacitive energy storage network for overcoming the non-uniform energy storage problems associated with the distributed parallel capacitance and dielectric of normal audio transmission lines so as to eliminate undesirable audible pre-emphasis in the audio signal range. Furthermore, inductor 1150 performs a unique function whereby the energy storage problems associated with the distributed series inductance of the line are overcome so as to eliminate undesirable audible pre-emphasis in the audio frequency range.

Thus, each of these networks and components performs a distinct, separate and specific function that is predictable according to the prior art discussed in combination with the teaching of the current invention. Together the networks and components combine synergistically to provide a low-noise audio transmission system with minimal undesirable pre-emphasis of the audio frequency spectrum. The improvement in sound quality using cables including these improvements has been audibly confirmed through controlled listening tests carried out on very high quality audio equipment in a special listening room which excludes environmental noise.

Figure 13:
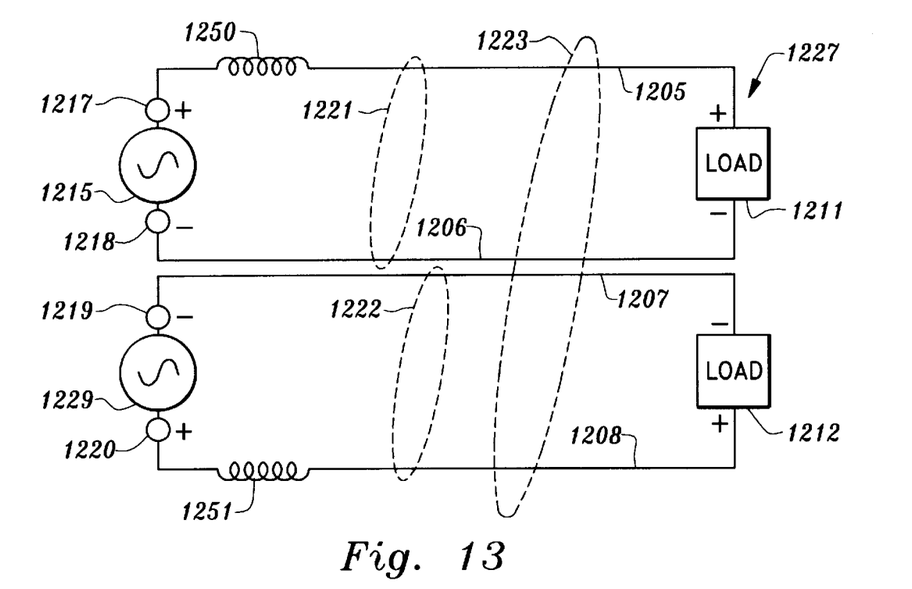
FIG. 13 is a schematic of a bi-amped audio transmission system, including inductive networks according to the present invention.

Referring to FIG. 13, there is provided a bi-amped audio transmission system 1227. Audio signal sources 1215, 1229 each have a positive output terminal 1217, 1220 and a negative output terminal 1218, 1219. Audio signal loads 1211, 1212, include corresponding positive and negative input terminals which are denoted by positive and negative signs, respectively. An audio signal transmission line 1223, comprises conductor bundles 1221, 1222. Conductor bundle 1221 comprises positive conductor or send line 1205 coupled between positive terminal 1217 of the source 1215 and the positive terminal of load 1211, and negative conductor or return line 1206 coupled between negative terminal 1218 and the negative terminal of load 1211. Conductor bundle 1222 comprises positive conductor or send line 1208 coupled between positive terminal 1220 and the positive terminal of load 1212 and negative conductor or return line 1207 coupled between negative terminal 1219 and the negative terminal of load 1212. Inductive network 1250 is coupled in series with send line 1205. Inductive network 1251 is coupled in series with send line 1208.

In a working embodiment of the invention as shown in FIG. 13, the inductors of inductive networks 1250 and 1251 each had a value of 1 mH. Load 1211 comprised a load optimized for high audio frequencies, such as a tweeter, and load 1212 comprised a load optimized for low audio frequencies, such as a woofer.

Figure 14:
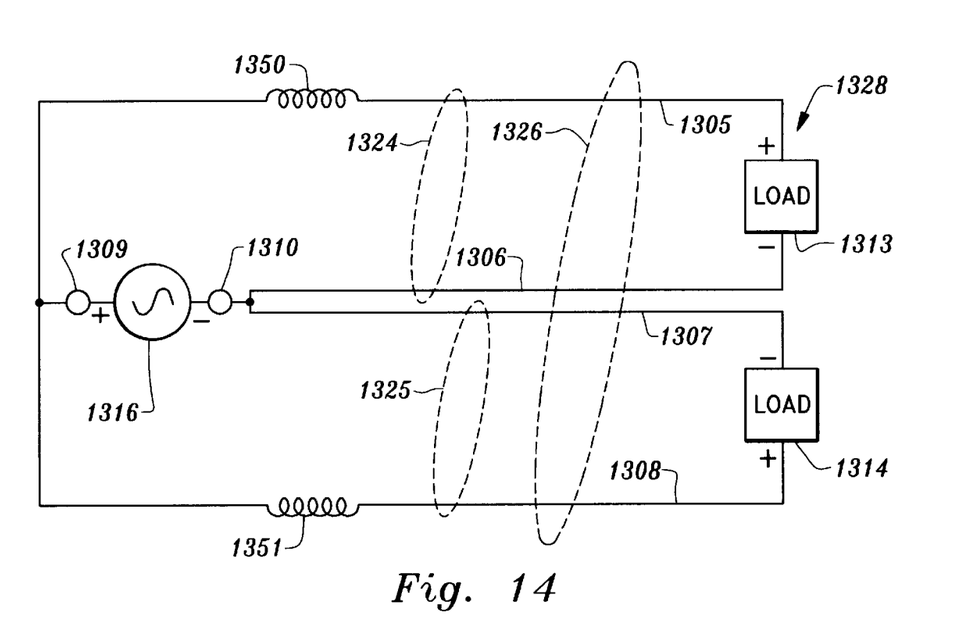
FIG. 14 is a schematic of a bi-wired audio transmission system including inductive networks according to the present invention.

FIG. 14 shows a bi-wired audio transmission system 1328. Audio signal source 1316 has positive output terminal 1309 and negative output terminal 1310. Audio signal load 1313 and audio signal load 1314, each have corresponding positive and negative input terminals denoted by positive and negative signs, respectively. Audio transmission line 1326, comprises conductor bundles 1324, 1325. Conductor bundle 1324 comprises positive conductor or send line 1305 coupled between the positive terminal 1309 of the source 1316 and the positive terminal of load 1313, and negative conductor or return line 1306 coupled between negative terminal 1310 of the source and the negative terminal of load 1313. Conductor bundle 1325 comprises positive conductor or send line 1308 coupled between positive terminal 1309 and the positive terminal of load 1314, and negative conductor or return line 1307 coupled between the negative terminal 1310 of source 1316 and the negative terminal of load 1314. Inductive network 1350, consisting of an inductor, is coupled in series with send line 1305 and inductive network 1351, consisting of an inductor, is coupled in series with send line 1308.

In a working embodiment of the invention as shown in FIG. 14, the inductors in each of the inductive networks comprised a value of 1 mH. Load 1313 was optimized for high audio frequencies, such as a tweeter, and load 1314 was optimized for low audio frequencies, such as a woofer.

Figure 15:
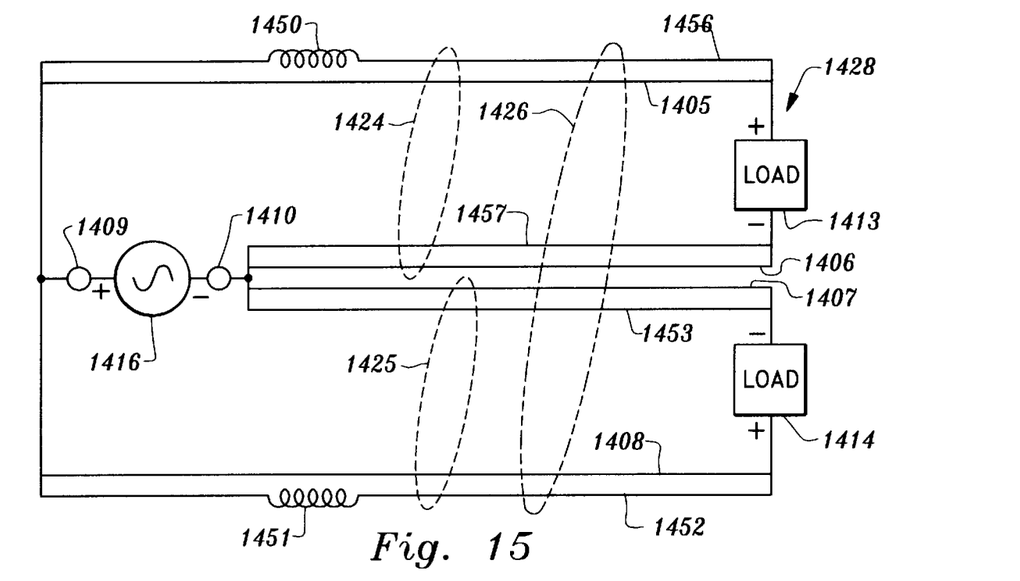
FIG. 15 is a schematic of another bi-wired audio transmission system including inductive networks according to the present invention.

FIG. 15 shows a bi-wired audio transmission system 1428. Audio signal source 1416, has positive output terminal 1409 and negative output terminal 1410. Audio signal load 1413 and audio signal load 1414, each have corresponding positive and negative input terminals denoted by positive and negative signs, respectively. Audio transmission line 1426, includes conductor bundle 1424, 1425. Conductor bundle 1424 comprises positive conductor or send line 1405 and an additional conductor 1456, each of which is coupled between the positive terminal 1409 of the source 1416 and the positive terminal of load 1413, and negative conductor or return line 1406 and an additional conductor 1457, each of which is coupled between negative terminal 1410 of the source and the negative terminal of load 1413. Conductor bundle 1425 comprises positive conductor or send line 1408 and an additional conductor 1452, each of which is coupled between positive terminal 1409 and the positive terminal of load 1414, and a negative conductor or return line 1407 and an additional conductor 1452, each of which is coupled between the negative terminal 1410 of source 1416 and the negative terminal of load 1414. Inductive network 1450, consisting of an inductor, is coupled in parallel with send line 1405, along conductor 1456, and inductive network 1451, consisting of an inductor, is coupled in parallel with send line 1408, along conductor 1452.

Figure 16:
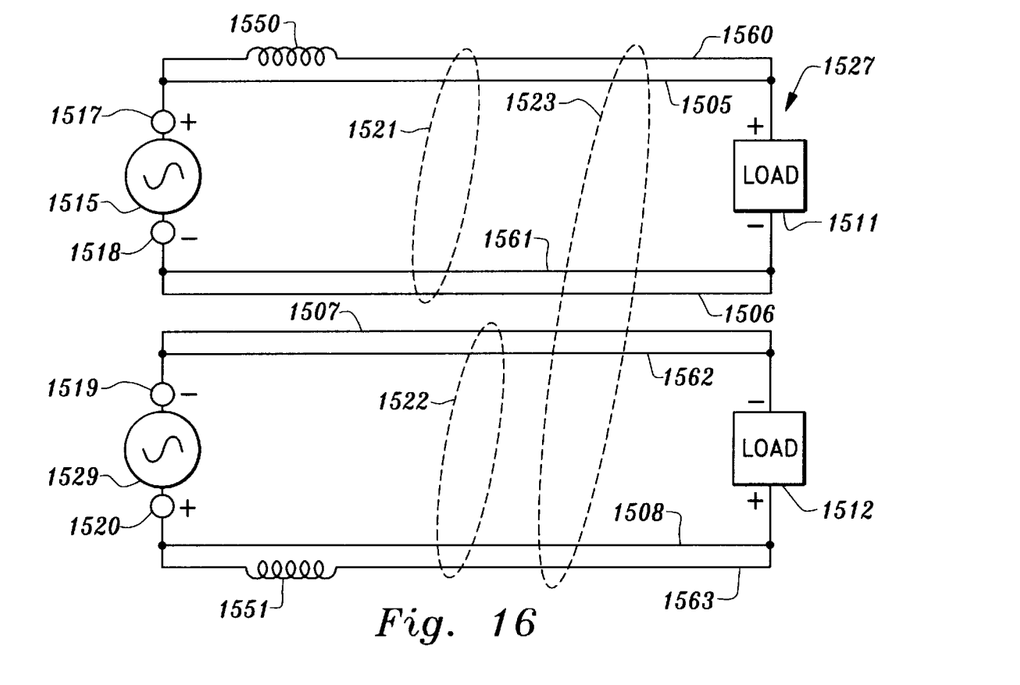
FIG. 16 a schematic of another bi-amped audio transmission system, including inductive networks according to the present invention

In FIG. 16, there is provided a bi-amped audio transmission system 1527. Audio signal sources 1515, 1529 each have a positive output terminal 1517, 1520 and a negative output terminal 1518, 1519. Audio signal loads 1511, 1512, have corresponding positive and negative input terminals denoted by positive and negative signs, respectively. An audio signal transmission line 1523, comprises conductor bundle 1521 with positive conductor or send line 1505 and an additional conductor 1560, each of which is coupled between positive terminal 1517 of the source 1515 and the positive terminal of load 1511, and also comprises a negative conductor or return line 1506 and an additional conductor 1561, each of which is coupled between negative terminal 1518 and the negative terminal of load 1511. The audio signal transmission line 1523 also includes a conductor bundle 1522 having a positive conductor or send line 1508 together with an additional conductor 1563, each of which is coupled between positive terminal 1520 and the positive terminal of load 1512 and a second negative conductor or return line 1507 together with an additional conductor 1562, each of which is coupled between negative terminal 1519 and the negative terminal of load 1512. Inductive network 1550 is coupled in parallel with send line 1505 along conductor 1560. Inductive network 1551 is coupled in parallel with send line 1508, along conductor 1563.

Figure 17:
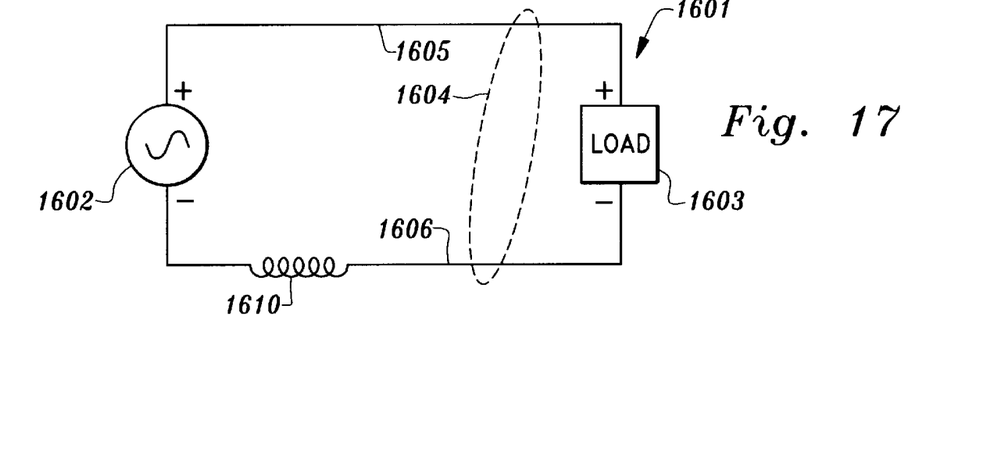
FIG. 17 is a schematic of an audio transmission system including an embodiment of an inductive network according to the present invention.

Referring now to FIG. 17 there is provided in accordance with the present invention an audio signal transmission system designated generally as 1601. In the system 1601 there is provided a source for audio signals 1602 and a load 1603 which is coupled to the source 1602 by a transmission line 1604 comprising a pair of conductors 1608: a send line 1605 coupled between the positive terminals of source 1602 and load 1603 and a negative conductor or return line 1606 coupled between the negative terminals of source 1602 and load 1603. There is further provided an inductive network 1610 coupled in series with return line 1606 between source 1602 and load 1603.

Figure 18:
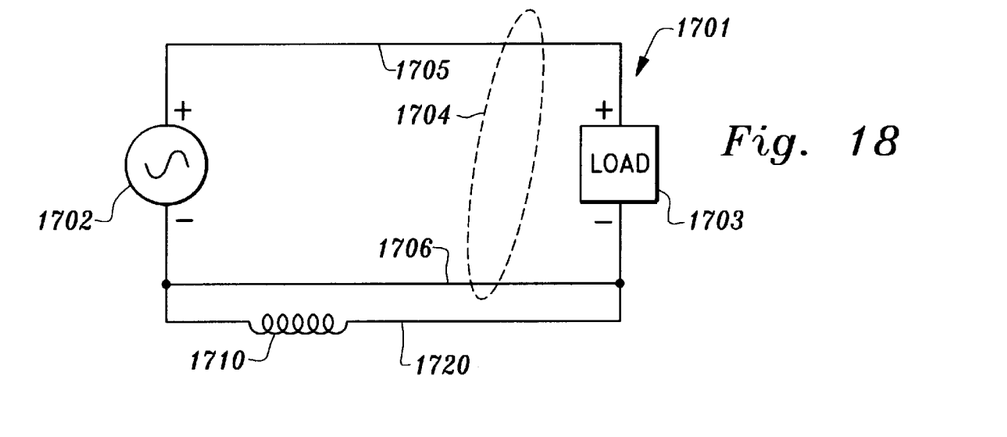
FIG. 18 is a schematic of an audio transmission system including an embodiment of an inductive network according to the present invention.

Referring to FIG. 18 there is provided an inductive network 1710 comprising an inductor, coupled in parallel with transmission line 1704 along the return line 1706 and in series with an additional conductor 1720, both of which are coupled between the negative terminals of source 1702 and load 1703. The positive terminals of the source 1702 and load 1703 are coupled by send line 1705.

Figure 19:
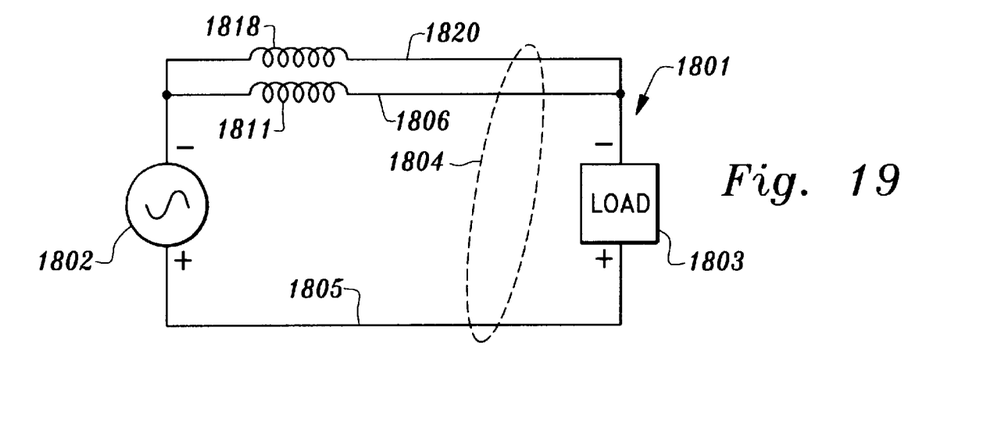
FIG. 19 is a schematic of an audio transmission system including embodiments of inductive networks according to the present invention.

Referring to FIG. 19 there are provided inductive networks 1811 and 1818 consisting of inductors in series with return line 1806 and additional conductor 1820, respectively. The send line 1805 and additional conductor 1820 connect the positive terminals of the source 1802 and load 1803. Return line 1806 connects the negative terminals of source and load. Together the conductors 1820, 1805 and 1806, and inductors form the transmission line 1804.

Although only two discrete capacitors and two discrete resistors are shown in the embodiments, it may be suitable to use several discrete capacitors and several discrete resistors physically distributed along the length of the audio signal transmission line. Furthermore, although specific values of capacitors and resistors are provided in the examples, as a general matter the values of the capacitors are selected to be relatively large to increase the energy storage of the audio transmission line, and the resistors are selected to be relatively small. The values, however, are preferably determined to cause the energy storage of the audio transmission line to be high. Hence a relatively large capacitance is desirable to provide a more consistent value measured as a percentage change of energy storage over the frequency range of interest than would be possible with the conductors alone. Normal considerations in selecting values for resistor-capacitor networks given a desired circuit characteristic, including frequency range, voltage, current, etc., are also used to select appropriate values given a particular conductor and expected use of the audio transmission line.

Similarly, although specific values of inductors are provided in the examples, as a general matter the values of the inductive networks are also selected to be relatively large, in order to increase the energy storage of the audio transmission line and are preferably determined such that the energy storage of the audio transmission line is high and of a more consistent value measured as a percentage change of energy over the frequency range of interest than would be possible with the conductors alone. Furthermore, while only two discrete inductive networks, each consisting of one inductor, are described in the examples, certain advantages might be gained through the use of several discrete inductors in the system. For example, physically distributing inductors along a transmission line can sometimes result in positive, audible benefits to sound quality, and may create a more aesthetically pleasing cable. Finally, as with the capacitive networks, the usual considerations in selecting values of inductors would also be considered in selecting the values of the inductive network or networks.

Use of the capacitive and inductive networks as described increases the energy storage capability of an audio transmission line significantly. For example, a typical high-quality audio cable might be able to store energy on the order of 1 joule. Audio transmission lines which comprise embodiments of the invention are capable of storing energy on the order of 300 joules or more. Thus, as has been confirmed audibly, use of the networks improves the signal quality produced by the audio transmission line.

While preferred embodiments are described above, it is contemplated that various modifications may be made without departing from the scope and spirit of the present invention, including, but not limited to the addition of more networks in the audio transmission line, distribution of networks along the transmission line, and different values for the various network components.

What is claimed is:

1. An audio signal transmission line suitable for connecting a source for generating signals in the audio frequency spectrum and a load, the source having a first terminal and a second terminal and the load having a first terminal and a second terminal, said transmission line comprising:

a first conductor having a source connection terminal suitable for connecting to the first terminal of the source and an load connection terminal suitable for connecting to the first terminal of the load;

a second conductor having an source connection terminal suitable for connecting to the second terminal of the source and an load connection terminal suitable for connecting to the second terminal of the load, said first and second conductors having a distributive capacitance which capacitively stores electrical energy at a non-uniform rate over the audio frequency spectrum; and a capacitive network coupled between the first conductor and the second conductor, for storing additional electrical energy, such that the audio signal transmission line stores electrical energy at a rate that is more uniform over a selected range of frequencies in the audio frequency spectrum than the non-uniform rate of the distributive capacitance of the first and second conductors; and wherein the capacitive network is not connected directly to the source connection terminal of the first conductor and the source connection terminal of the second conductor and wherein the capacitive network is not connected directly to the load connection terminal of the first conductor and the load connection terminal of the second conductor.

2. An audio signal transmission line according to claim 1 wherein the capacitive network is such that the audio signal transmission line stores electrical energy at an approximately uniform rate over the audio frequency spectrum.

3. An audio signal transmission line according to claim 1 wherein the capacitive network comprises a discrete capacitive element.

4. An audio signal transmission line according to claim 1 wherein the capacitive network comprises a discrete capacitive element and a discrete resistive element.

5. An audio signal transmission line according to claim 4 wherein the discrete resistive element comprises a discrete resistor and the discrete capacitive element comprises a discrete capacitor.

6. An audio signal transmission line according to claim 4 wherein the resistive element has a value of no more than 5 ohms and the capacitive element has a value of at least 0.1 microfarads.

7. An audio signal transmission line according to claim 4 wherein the resistive element is no more than 5 ohms and the capacitive element has a value of at least 100 picofarads.

8. An audio signal trasmission line according to claim 1 wherein the capacitive network is coupled between the first conductor and the second conductor such that the capacitive network is near the load connection terminal of the first conductor and the load connection terminal of the second conductor.

9. An audio signal transmission line according to claim 1 wherein the first and second conductors are configured as a standard parallel wire-type cable.

10. An audio signal transmission line according to claim 1 wherein the capacitive network is coupled between the first conductor and the second conductor such that the capacitive network is near the source connection terminal of the first conductor and the source connection terminal of the second conductor.

11. An audio signal transmission line suitable for connecting a source for generating signals in the audio frequency spectrum and a load, the source having a first terminal and a second terminal and the load having a first terminal and a second terminal, said transmission line comprising:

first conductor means for electrically connecting the source and the load, said first conductor means having a source connection terminal means for connecting to the first terminal of the source and an load connection terminal means for connecting to the first terminal of the load;

second conductor means for electrically connecting the source and the load, said second conductor means having an source connection terminal for connecting to the second terminal of the source and an load connection terminal for connecting to the second terminal of the load, said first and second conductor means storing electrical energy at a non-uniform rate over the audio frequency spectrum; and energy storage network coupled with the first conductor means and with second conductor means, for storing additional electrical energy, such that the audio signal transmission line stores electrical energy at a rate that is more uniform over a selected range of frequencies in the audio frequency spectrum than the non-uniform rate; and wherein the energy storage network is not connected directly to the source connection terminal of the first conductor means and the source connection terminal of the second conductor means; and wherein the energy storage network is not connected directly to the load connection terminal of the first conductor means and the load connection terminal of the second conductor means.

12. An audio signal transmission line according to claim 11 wherein energy storage network is such that the audio signal transmission line stores electrical energy at an approximately uniform rate over the audio frequency spectrum.

13. An audio signal transmission line according to claim 11 wherein the energy storage network comprises a discrete capacitor.

14. An audio signal transmission line according to claim 11 wherein the energy storage network comprises a discrete capacitor and a discrete resistor.

15. An audio signal transmission line according to claim 11 wherein the energy storage network is coupled between the first and second conductor means such that the energy storage network is near the load connection terminals of the first conductor means and second conductor means.

16. An audio signal transmission line according to claim 11 wherein the first and second conductor means are configured as a standard parallel wire-type cable.

17. An audio signal transmission line according to claim 11 wherein the energy storage network is coupled between the first conductor means and the second conductor means such that the capacitive network is near the source connection terminal of the first conductor means and the source connection terminal of the second conductor means.

18. A method of suppressing noise in an audio signal transmission system having a source for generating signals in the audio frequency spectrum said source having a first terminal and a second terminal; a load, said load having a first terminal and a second terminal, and a transmission line comprising: a first conductor having a source connection terminal connected to the first terminal of the source and an output load connection terminal connected to the first terminal of the load; and a second conductor having an source connection terminal connected to the second terminal of the source and an load connection terminal connected to the second terminal of the load, and wherein said first and second conductors having a distributive capacitance such that the transmission line capacitively stores electrical energy at a non-uniform rate over the audio frequency spectrum; the method comprising the steps of:

coupling a means for providing capacitance to the first conductor; and coupling a means for providing resistance between said means for proving a capacitance and the second conductor, the means for providing capacitance and resistance being such that the transmission line and the means for providing capacitance and resistance stores electrical energy at a more uniform rate over a selected range of frequencies in the audio frequency spectrum than the non-uniform rate; and wherein the step of coupling a means for providing capacitance includes the step of coupling the means for providing capacitance such that the means for providing capacitance is not coupled directly to the source connection terminal of the first conductor or is not directly to the load connection terminal of the first conductor; and wherein the step of coupling the means for providing resistance includes the step of coupling the means for providing resistance such that the means for providing resistance is not coupled directly to the source connection terminal of the second conductor or is not directly the load connection terminal of the second conductor.

19. A method according to claim 18 wherein the step of coupling a means for providing capacitance includes the step of coupling a discrete capacitor, and the step of coupling the means for providing resistance includes the step of coupling a discrete resistor.

* * * * *